July 23, 1968  T. E. WALDROP  3,394,245

RESILIENT ROLLER AND HEAT SEALING MEANS

Filed Sept. 15, 1964

United States Patent Office 3,394,245
Patented July 23, 1968

3,394,245
RESILIENT ROLLER AND HEAT
SEALING MEANS
Thomas E. Waldrop, Greer, S.C., assignor to W. R. Grace
& Co., Duncan, S.C., a corporation of Connecticut
Filed Sept. 15, 1964, Ser. No. 396,637
10 Claims. (Cl. 219—469)

ABSTRACT OF THE DISCLOSURE

A resilient roller with a plurality of elongated members spaced axially and circumferentially about a shaft extending between a pair of spaced apart circular members, the elongated members are mounted by guiding means at their respective ends to mating guiding means in said circular members for radial inward movement and interconnected so that pressure exerted on one elongated member will depress that member and also cause depression of adjacent interconnected elongated members.

---

This invention relates to a resilient roller. In one aspect the invention relates to a flexible means for heating.

This invention is broadly applicable to a novel resilient roller. There are an almost unlimited variety of uses for a rotatable roller which will provide a surface which will be depressed upon the application of pressure thereon. For simplicity, the invention will be described with reference primarily to a particular use for such a resilient roller, namely, a mechanism for heat sealing or heat shrinking film wrapped about an object, however, the invention is not limited to this particular application.

Various flexible sheet materials, plastic films, coated foils and the like have been used in the packaging of objects including food products. These materials provide an inexpensive substantially air tight package when properly sealed which will maintain perishable items in a state of freshness for a relatively long period of time and, due to their transparency, produce a highly attractive package. For example, with certain food products, such as cheese, it is possible to employ a heat shrinkable transparent film, such as irradiated biaxially oriented polyethylene which, after being overwrapped about the package, can be heat sealed at the overlap and then subjected to elevated temperatures to shrink the film tightly about the package. In the case of food, such as cheese, the application of the proper temperature not only shrinks the film tightly, but also results in "oiling-off." This latter term refers to causing the butter fat to cling to the surface of the film due to melting of the outer surface of the cheese. This not only improves the appearance by providing a smooth surface, but eliminates oxygen which would cause deterioration of the product.

A number of devices have been proposed for accomplishing this objective including one set forth in a copending application Ser. No. 394,744, filed Sept. 8, 1964, by Thomas E. Waldrop, John M. Cook and Thomas R. Lazar issued as Patent No. 3,316,689. In this application is disclosed a series of resilient rollers with the object to be wrapped passing first between two horizontal heated rollers to heat seal the overlapped film and to shrink the film on the top and bottom and then through two vertical resilient heated rollers for heat shrinking the film on the sides of the object. In addition, means are provided for sealing the ends of the object. It is disclosed therein that any type of resilient roller may be employed such as a sponge roller having a sleeve of silicon rubber having electrically resistant wires embedded therein. One difficulty with the sponge type roller is that there is sufficient heat capacity in the sponge rollers so that upon passage of a high rate of cold objects therethrough the rollers cool and are ineffective.

It is an object of the invention to provide a resilient roller.

It is another object of the invention to provide a heated resilient roller.

Still another object of the invention is to provide a heated resilient roller having high thermal capacity.

These and other objects of the invention will be readily apparent to those skilled in the art from the accompanying disclosure, drawing and appended claims.

Figure 1:
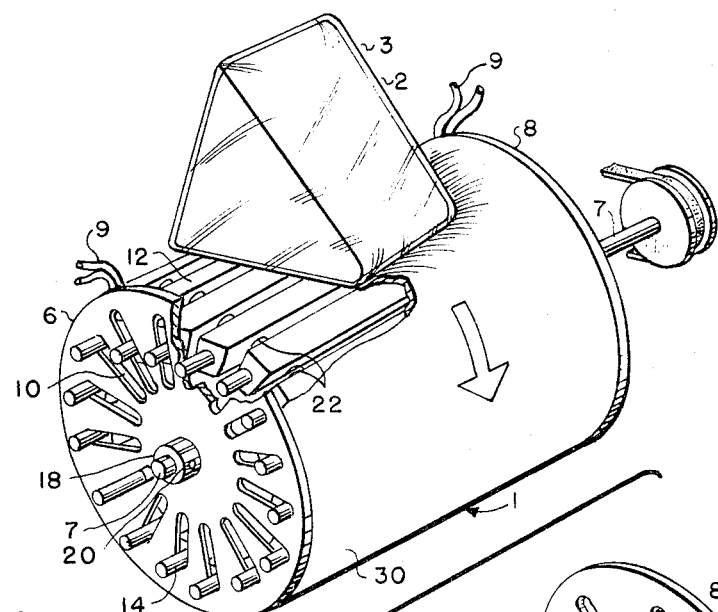
FIGURE 1 is a perspective view of an assembled resilient heated roller with the heating means partially cut away to reveal the heating bars.

It has now been discovered that a resilient roller having high thermal capacity can be made by resiliently mounting a plurality of elongated members spaced axially and circumferentially about a centrally located shaft. The elongated members are retained in their relative positions by adapting a projection on both ends thereof to fit into radial slits contained in a pair of circular members having a central aperture adapted to receive the shaft.

The invention is best described by reference to the drawing.

Figure 2:
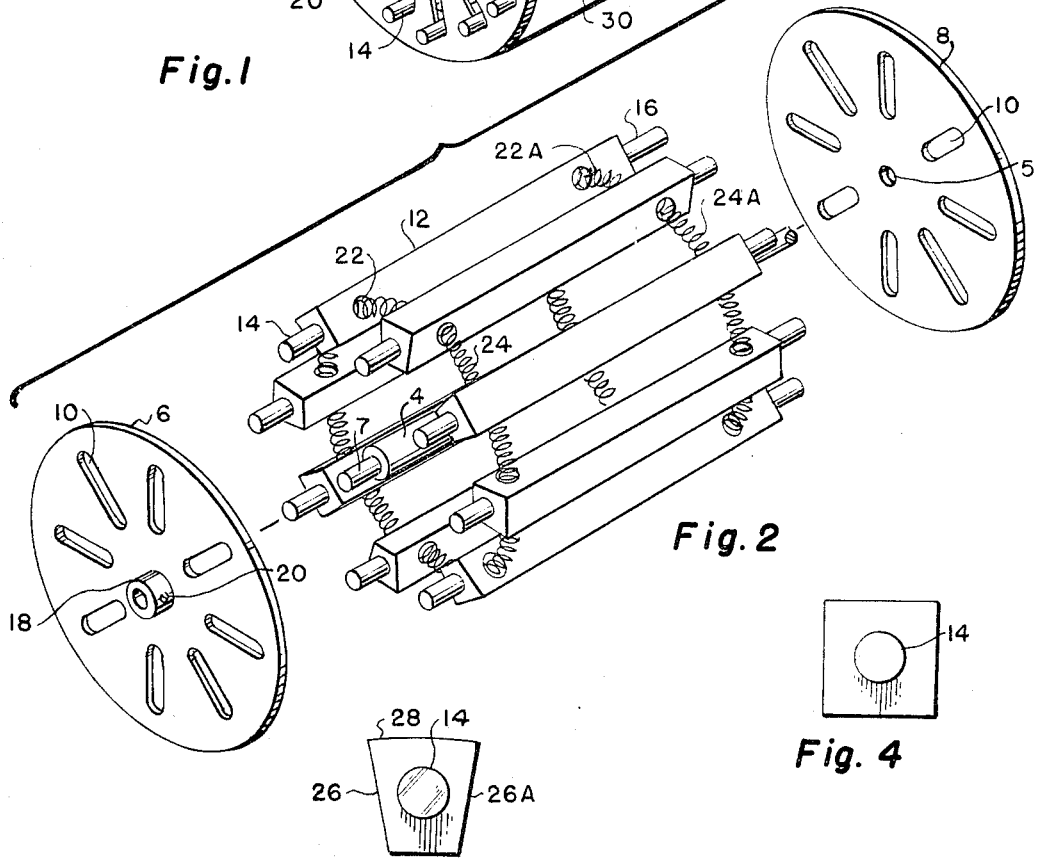
FIGURE 2 is a partial exploded view of the roller of FIGURE 1 sans the heating mechanism.
Figure 3:
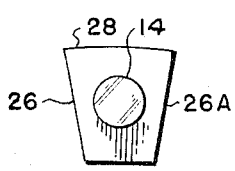
FIGURE 3 is an end view of one of the elongated members.
Figure 4:
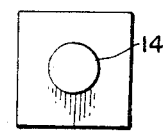
FIGURE 4 shows an end view of a rectangular elongated member.

FIGURE 1 shows an assembly of the resilient roller 1 with an object 2 wrapped in film 3 passing thereover. The assembly comprises a centrally located shaft 4 having a reduced end portion 7 mounted in an aperture 5 in the central portion of two discs 6 and 8. These discs have radial slits 10 directed toward the shaft. These slits may be of any suitable length sufficient to permit the required depression of the elongated members. A plurality of elongated members 12 having projections or pins 14 and 16 on both ends are employed as the heat sink device as best illustrated in FIGURE 2. In FIGURE 2 elongated members 12 are axially and circumferentially mounted around shaft 4. Either end of the shaft fits into the central aperture of the discs 6 and 8 and are suitably mounted thereon, such as by a collar 18 and set screw 20. The pins 14 and 16 ends of the elongated members are adapted to fit into the radial 10 in discs 6 and 8 respectively. Any suitable means may be provided for resiliently mounting the elongated members axially and circumferentially about the shaft but spaced apart therefrom so that pressure exerted radially thereon, such as by object 2, will depress the elongated members individually. A suitable means is best illustrated in FIGURE 2 wherein orifices 22 and 22A in the sides of the elongated members 12 provide passageways therethrough circumferentially about the shaft 4. Compression springs 24 and 24A are then threaded through the holes and suitably linked together to form a circle. The number of elongated members employed will depend upon the ultimate usage and the degree of contact required with the object passing thereover. Eight bars have been shown for simplicity in FIGURE 2 but sixteen bars in FIGURE 1. The number of radial slits 10 will correspond thereto. The elongated members are spaced to permit depression of the individual elongated members radially at least as far as the radial slits 10 will permit. Therefore, tapered sides 26 and 26A, such as shown in FIGURES 2 and 3, are advantageous. It is also within the scope of the invention to slightly curve the exterior surface 28 of the elongated member such as shown in FIGURE 3 to provide an arcuate surface so as to present a uniform curved surface when the members are at their furtherest point of travel from the shaft. Another suitable shape is a rectangle or square as shown in FIGURE 4.

Any suitable means may be employed for resiliently mounting the individual members, for example, compression springs could be provided affixed between the shaft and each elongated member. The length of the elongated members is not limitative but will be dependent upon the size of the object passing thereover. The members are shown as held in place by slits in a pair of discs. Any suitable shape may be employed in lieu of discs, for example, a simple circular member, such as a hemisphere, having radial slits on the interior surface thereof is suitable. The roller aforedescribed will have many uses readily apparent to those skilled in the art where resilient rollers are required. A particularly suitable use is heating of objects passed thereover or between a pair of these rollers.

In operation, the passage of an object 2 thereover, or between two of the rollers closely spaced, will depress the individual heating bars 12 as shown in FIGURE 1 as the object contacts individual bars. The interconnection of elongated members 12 by springs 24 and 24A provides slight depression of the members adjacent thereto. Any number of springs may be employed depending upon the resiliency required.

A particularly advantageous usage for the device of this invention is in the packaging of a block of cheese packaged in a film 3 of heat shrinkable polyethylene (such as described in patents to Baird et al.—U.S. 3,022,543 and Rainer et al.—U.S.2,877,500, incorporated herein by reference). A pair of rollers are horizontally mounted and spaced apart at a distance slightly less than the thickness of the package. The film is overwrapped about the package (overlap down) and passed between the rollers. The roller contacting the overlapped film is heated to a temperature to permit heat sealing and the other roller is heated to a temperature to permit heat shrinking of the film 3. The sides of the package may be then similarly treated by the use of vertical rollers. Any suitable means may be provided for adjustment of the distances between the horizontal or vertical pairs of rollers.

The temperatures of the individual roller may be controlled by any suitable means so long as the surface temperatures are sufficient to provide either heat shrinking or heat sealing of the film when in contact therewith. The particular temperatures employed as well as the selection of the mass and type of material in the elongated members will depend upon the film being heated.

Any suitable means may be employed for rotating the individual rollers. Many driving means will be readily apparent to those skilled in the art within the scope of the invention.

In a typical example, blocks of cheese wrapped in Saran film (vinylidene chloride-vinyl chloride copolymer) were passed over a heated roller of the type shown in FIGURE 1. The roller was four inches in diameter by nine inches long. The 18 aluminum heating bars were ½″ x ½″ x 8½″ long. The length of slot 10 was ¾″ with a normal depression in use of ½–⅝″. The 18 aluminum bars were threaded on two ¼″ diameter by 11″ long compression springs spaced equally by two slotted end caps.

The elongated members may be heated by any suitable means and will retain their heat due to their mass. Any thermally conductive material may be employed but the metals such as aluminum, iron, steel, copper, brass and the like are preferred for their ease of heating. A particularly suitable means of heating the members is to provide a sleeve 30 with electrically resistant wires (not shown) embedded and connected to a suitable source of current (not shown) through wires 9. The sleeve may be made of any resilient material such as slicone rubber. Another suitable method of heating would be to supply heat to the bars by hot air or the like introduced to the interior of the roller. For example, the shaft 4 may be electrically heated such as by a cartridge heater inserted in the shaft with the shaft having fins to aid in heat transfer. A blower could be employed to convey heat from the shaft to the heating bars 12.

While certain examples, compositions and process steps have been described for purposes of illustration, the invention is not limited to these. Variation and modification within the scope of the disclosure and the claims can be readily effected by those skilled in the art.

I claim:

1. A resilient roller comprising, in combination:
   (a) a shaft,
   (b) a plurality of elongated members spaced axially and circumferentially about said shaft but spaced apart therefrom,
   (c) guide means on both ends of said members,
   (d) a pair of circular members having mating radial guide means adapted to receive said guide means for radial movement of said members,
   (e) an aperture in the central portion of said circular members adapted to receive said shaft and
   (f) connecting means interconnecting said elongated members providing an integral unit so that pressure exerted on an elongated member will depress the elongated member radially toward said shaft and also cause depression of adjacent interconnected members.

2. The roller of claim 1 wherein said elongated members are hexahedrals having substantially plane surfaces.

3. The roller of claim 1 wherein said elongated members are truncated triangles.

4. The roller of claim 1 wherein said elongated member has an arcuate surface, exterior with respect to said shaft, so as to present a substantially uniform curved surface when said members are at their furtherest point of travel from said shaft.

5. A resilient roller comprising, in combination:
   (a) a shaft,
   (b) a plurality of elongated members spaced axially and circumferentially about said shaft but spaced apart therefrom,
   (c) a projection on both ends of said members,
   (d) a pair of discs having radial slits adapted to receive said projections thus permitting radial movement only of said members,
   (e) an aperture in the central portion of said discs adapted to receive the end portions of said shaft,
   (f) resilient means interconnecting the side portions of said elongated members thus providing an integral unit so that when pressure is exerted on an elongated member it will be depressed radially toward said shaft and also cause depression of adjacent interconnected members.

6. The roller of claim 5 wherein said elongated members have at least one orifice in the side of each member thus providing passageway therethrough, and a compression spring extending through the series of members thus resiliently interconnecting said members.

7. The roller of claim 5 wherein said elongated members are hexahedrals having substantially plane surfaces.

8. A resilient heated roller comprising, in combination:
   (a) a shaft,
   (b) a plurality of elongated, solid, thermally conductive members having plane sides spaced axially and circumferentially about said shaft but spaced apart therefrom,
   (c) axially projecting pins on both ends of said members,
   (d) at least one orifice in the side surfaces of each of said members providing passageways therethrough,
   (e) elongated spring means extending through said passageways forming a circle so as to form a series of interconnected members about said shaft, (f) a pair of discs having radial slits adapted to receive said pins,
(g) an aperture in the central portion of said discs adapted to receive said shaft and
(h) means for heating said elongated members.

9. The apparatus of claim 8 wherein said means for heating comprises an elastic sleeve circumenveloping said elongated members, said sleeve containing electrically resistant heating wires, and a source of electrical current connected to said wires.

10. The apparatus of claim 8 wherein said means for heating comprises means for heating said shaft.

References Cited

UNITED STATES PATENTS

| | | | |
|---|---|---|---|
| 244,939 | 7/1881 | Shirley | 29—126 |
| 253,420 | 12/1882 | Pelisse | 29—126 |
| 642,099 | 1/1900 | Faulkner | 100—163 |
| 2,680,471 | 6/1954 | Mercer | 156—583 |
| 2,953,291 | 9/1960 | Huck | 29—117 |

EARL M. BERGERT, *Primary Examiner.*

W. E. HOAG, *Assistant Examiner.*